United States Patent
Oroskar et al.

(10) Patent No.: US 10,455,464 B1
(45) Date of Patent: Oct. 22, 2019

(54) DYNAMIC HANDOVER THRESHOLD ADJUSTMENT

(71) Applicant: Sprint Spectrum LP, Overland Park, KS (US)

(72) Inventors: Siddharth Oroskar, Overland Park, KS (US); Jasinder Singh, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/593,426

(22) Filed: May 12, 2017

(51) Int. Cl.
| | |
|---|---|
| *H04W 36/00* | (2009.01) |
| *H04W 72/04* | (2009.01) |
| *H04W 48/16* | (2009.01) |
| *H04B 17/40* | (2015.01) |
| *H04B 17/318* | (2015.01) |
| *H04L 5/14* | (2006.01) |

(52) U.S. Cl.
CPC ...... *H04W 36/0083* (2013.01); *H04B 17/318* (2015.01); *H04B 17/40* (2015.01); *H04L 5/1438* (2013.01); *H04W 48/16* (2013.01); *H04W 72/0453* (2013.01)

(58) Field of Classification Search
CPC .................................................. H04W 36/0083
USPC ........................................................ 370/235
See application file for complete search history.

(56) References Cited

U.S. PATENT DOCUMENTS

| | | | |
|---|---|---|---|
| 8,682,313 B2 | 3/2014 | Kim et al. | |
| 2013/0039185 A1* | 2/2013 | Teyeb | H04B 7/155 370/235 |
| 2015/0312832 A1* | 10/2015 | Huang | H04W 36/0055 370/338 |
| 2016/0157189 A1* | 6/2016 | Li | H04W 52/346 370/311 |

* cited by examiner

*Primary Examiner* — Chuck Huynh

(57) ABSTRACT

A method of allocating frequency bands of an access node includes determining a number of relay wireless devices attached to a donor access node neighboring the access node and transmitting to the access node information related to the number of relay wireless devices attached to the donor access node. An inter-frequency handover threshold of the access node is altered based at least in part on the information related to the number of relay wireless devices attached to the donor access node. Systems and methods relate to allocating frequency bands of an access node.

13 Claims, 4 Drawing Sheets

DYNAMIC HANDOVER THRESHOLD ADJUSTMENT

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or donor access node and an end-user wireless device. Because relay wireless devices exhibit significantly higher activity levels than end-user devices, the introduction of wireless relay devices can contribute to interference, such as cross talk or co-channel interference, in neighboring access nodes. The amount of interference may increase with an increase in number of wireless relay devices attached to the donor access node.

One general approach to mitigating interference is to offload devices from one frequency band class in which the interference is occurring to another frequency band class with less potential for interference. For example, in wireless networks that deploy multiple frequency bands within a single geographic area, such as co-located cells or access nodes, inter-frequency handovers are used to offload end-user wireless devices from a congested frequency band to a non-congested frequency band. Typically, inter-frequency handovers are triggered based on radiofrequency (RF) strength of signals transmitted from one or more access nodes. For example, in a long-term evolution (LTE) system, signal level parameters including thresholds are transmitted to end-user wireless devices in system information block (SIB) messages, and measurement events such as A2, A3 and A5 events can trigger a handover request from an end-user wireless devices based on whether a signal level of an access node exceeds or falls below a threshold.

Overview

Exemplary embodiments described herein include methods, systems, and devices for dynamic handover threshold adjustment based on a number of relay wireless devices attached to a neighboring cell. A method of allocating frequency bands of an access node includes determining a number of relay wireless devices attached to a donor access node neighboring the access node and transmitting to the access node information related to the number of relay wireless devices attached to the donor access node. An inter-frequency handover threshold of the access node is altered based at least in part on the information related to the number of relay wireless devices attached to the donor access node.

A method of allocating frequency bands of an access node among user devices includes determining a number of wireless relay devices attached to a donor access node neighboring the access node, transmitting to the access node information related to the number of wireless relay devices attached to the donor access node, comparing a radio characteristic of the access node with a threshold radio characteristic based at least in part on the information related to the number of wireless relay devices attached to the donor access node, and offloading a relay wireless device from a first frequency band class of the access node to a second frequency band class of the access node based on a comparison of the radio characteristic and the threshold radio characteristic.

A system includes an access node, a neighboring donor access node, and a processor associated with the access node. The processor is configured to receive information related to a number of relay wireless devices attached to the donor access node, alter a threshold radio characteristic based at least in part on the information related to the number of relay wireless devices attached to the donor access node, and offload a user device from a first frequency band class of the access node to a second frequency band class of the access node based on a comparison of the radio characteristic and the threshold radio characteristic.

DETAILED DESCRIPTION

In embodiments disclosed herein, an access node is enabled to adjust a handover threshold based on a number of relay wireless devices attached to a neighboring access node (i.e., a donor access node). For example, the access node may be enabled to adjust a handover threshold for offloading user equipment from frequencies on a first band class to frequencies on a second band class based on a number of relay wireless devices attached to the donor access node on the first band class.

The donor access node may determine a number of relay wireless devices attached to the donor access node. The donor access node then transmits information related to the number of relay wireless devices attached to the donor access node to the access node. For example, the information related to the number of relay wireless devices attached to the donor access node may be transmitted to the subject access node over a direct communication protocol, such as an X2 connection, or another communication protocol.

Based on the information related to the number of relay wireless devices attached to the donor access node, the access node may adjust a handover threshold to control offloading of user equipment attached to the access node from a first frequency band class to a second frequency band class. For example, when the information indicates a relatively large number of relay wireless devices are attached to the donor access node, the potential for interference increases, and user equipment attached to the access node may be offloaded to the second frequency band more aggressively. Conversely, when the information indicates a relatively small number of relay wireless devices are attached to the donor access node, then the potential for interference is reduced and the user equipment attached to the access node is more likely to be retained on the first frequency band.

The handover threshold may be based on one or more signal quality indicators. For example, the handover threshold may be based on reference signal received power (RSRP), reference signal received quality (RSRQ), or another signal quality indicator. By adjusting the handover threshold, the access node may reduce the likelihood of user equipment attached to the access node experiencing interference attributable to relay wireless devices attached to the donor access node.

Figure 1:
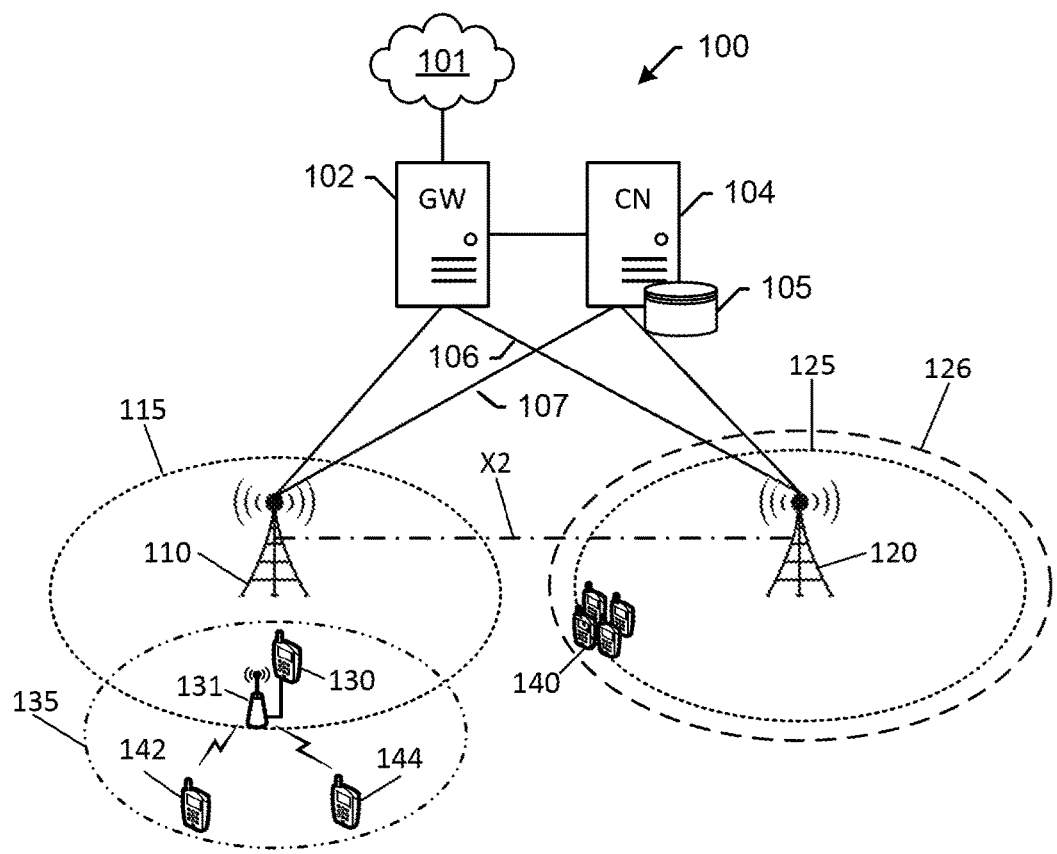
FIG. 1 depicts an exemplary system for dynamic handover threshold adjustment.

FIG. 1 depicts an exemplary system 100 for dynamic handover threshold adjustment. In an embodiment, system 100 comprise long-term evolution (LTE) systems deploying multiple frequency bands in three different band classes:

band class B25 using frequency-division duplexing (FDD) and comprising frequencies around 1.9 GHz, band class B26 using FDD and comprising frequencies around 850 MHz, and band class B41 using time-division duplexing (TDD) and comprising frequencies around 2.5 GHz. The operations described herein may be applicable to other systems deploying band classes in other frequency bands and using a TDD or FDD communication protocol.

System 100 comprises a communication network 101, gateway node 102, controller node 104, access nodes 110 and 120, a relay wireless device 130, and end-user wireless devices 140, 142, and 144. In this embodiment, relay wireless device 130 relays services from the donor access node 110 to end-user wireless devices 142 and 144. The donor access node 110 may be characterized as a donor access node based on the relay wireless device 130 being attached to the donor access node 110. The relay wireless device 130 may be communicatively coupled to a mini-macro access node 131. Mini-macro access node 131 acts as a wireless access point for wireless devices 142 and 144.

Donor access node 110 is illustrated as having coverage area 115, and access node 120 is illustrated as having coverage area 125. Coverage areas 115 and 125 may represent coverage areas in the same band class. Where coverage areas 115 and 125 overlap or are nearby one another, as shown in FIG. 1, the donor access node 110 may be referred to as a neighboring donor access node. In an exemplary embodiment, the coverage areas 115 and 125 of the donor access node 110 and access node 120 represent a coverage area of a relatively high-frequency TDD band class BAND1 (such as, for example, band class B41). The access node 120 deploys a band class in addition to BAND1. In the exemplary embodiment of FIG. 1, the access node 120 deploys one or more relatively low-frequency band classes BAND2 (such as one or both of B25 and B26) in addition to BAND1. The coverage area 126 represents coverage of band class(es) BAND2. The larger coverage area 126 is caused by the propagation characteristics of the lower frequency signal. The donor access node 110 may or may not deploy band classes in addition to BAND1. For example, in one embodiment, the donor access node 110 may deploy one or more low-frequency band classes BAND2 (such as one or both of B25 and B26) in addition to BAND1, coverage areas of which are omitted from the drawings for clarity. In exemplary embodiments, the donor access node 110 and the access node 120 may comprise two co-located cells, or antenna/transceiver combinations that are mounted on the same structure.

Relay wireless device 130 is located inside coverage area 115 of the donor access node 110. Wireless devices 142 and 144 are located outside either coverage area 115, 125, but within coverage area 135 of mini-macro access node 131. Wireless devices 142 and 144 that are outside coverage areas 115, 125 may access network services by virtue of being connected to relay wireless device 130 via mini-macro access node 131. A cluster of wireless devices 140 is located within coverage areas 125 and 126 of the access node 120, but outside coverage areas 115 and 135.

In the embodiment of FIG. 1, additional user equipment devices (not shown, but may be similar to wireless devices 140, 142, and 144) may be attached directly to the donor access node 110 using BAND1. The user equipment attached directly to the donor access node 110 may communicate with communication network 101 via a different public land mobile network (PLMN) than the relay wireless device 130. Information regarding the number of relay wireless devices attached to the donor access node may be obtained by determining the number of devices attached through the PLMN servicing the relay wireless devices.

Access nodes 110 and 120 can be any network node configured to provide communication between end-user wireless devices 140 and communication network 101. For instance, access nodes 110 and 120 may include any access node, such as a macrocell access node, base transceiver station, a radio base station, an eNodeB device, an enhanced eNodeB device, or the like. In an exemplary embodiment, coverage areas 115, 125, and 126 can represent a coverage area having a radius in the range of approximately five kilometers to seventy kilometers and an output power in the tens of watts, such as a range from about 10 watts to about 80 watts.

Access nodes 110 and 120 can comprise a processor and associated circuitry to execute or direct the execution of computer-readable instructions to obtain information as further described with reference to FIG. 3. Access nodes 110 and 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110 and 120 can receive instructions and other input at a user interface. Access nodes 110 and 120 communicate with gateway node 102 and controller node 104 via communication links 106, 107. Access nodes 110 and 120 may communicate with each other and with other access nodes using a direct link such as an X2 link or similar. For example, each access node 110 and 120 transmits information to neighboring access nodes, and receives information therefrom.

Wireless devices 140, 142, and 144 may include any device, system, combination of devices, or other such communication platform capable of communicating wirelessly with access nodes 110 and 120 using one or more frequency bands deployed therefrom. Wireless devices 140 may include, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110 and 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 101 can carry data, for example, to support voice, push-to-talk, broadcast video, and data communications by wireless devices 140, 142, and 144. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path, including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format, including combinations or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics, such as public land mobile network (PLMN) identifiers of access nodes 110 and 120, as well as information about end-user wireless devices 140. This information may be requested by or shared with access nodes 110 and 120 via communications links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110 and 120 and communication network 101.

Figure 2:
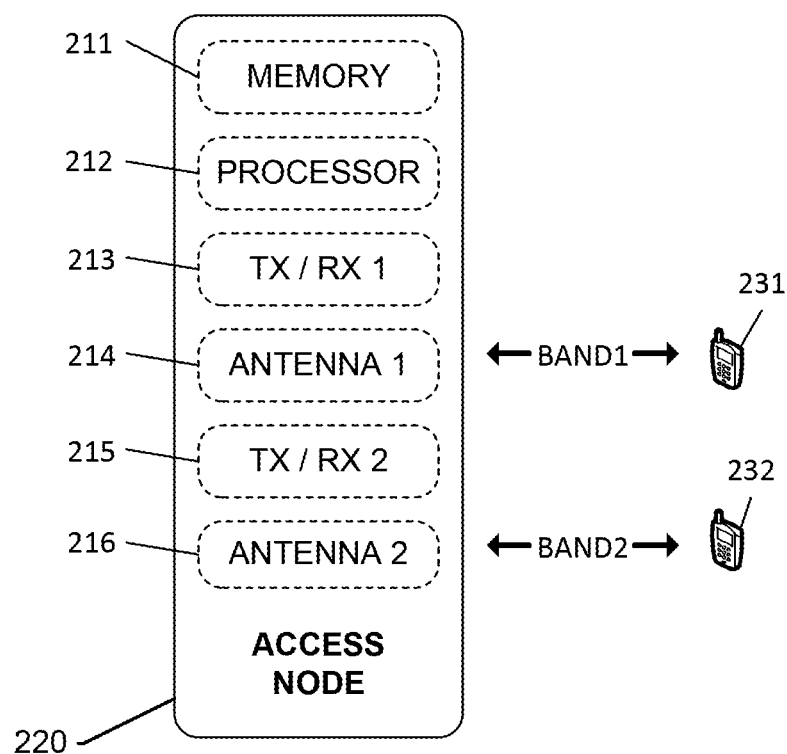
FIG. 2 depicts an exemplary access node.

FIG. 2 depicts an exemplary access node 220 for performing methods in accordance with the disclosure. Access node 220 may be a macro-cell access node as described above, and provides network services to end-user wireless devices 231, 232. Access node 220 is illustrated as comprising a memory 211 for storing logical modules including methods of adjusting handover thresholds operations described herein, a processor 212 for executing the logical modules, a first transceiver 213 and antenna 214 for communication with end-user wireless device 231 over a first frequency band BAND1, and a second transceiver 215 and antenna 216 for communication with end-user wireless device 232 over a second frequency band BAND2. Thus, access node 220 can deploy two co-located cells, and balance loads between the two cells by adjusting handover thresholds to trigger handovers between the two cells. Moreover, although only one transceiver and antenna combination is depicted in access node 220, additional transceivers and antennas may be incorporated to deploy multiple frequency bands and to facilitate communication across other network nodes that are not shown, such as gateways, controllers, and other access nodes.

In operation, the presence of relay wireless device 130 (FIG. 1) connected to donor access node 110 (FIG. 1) on band class BAND1 may contribute to interference, such as crosstalk and/or co-channel interference (CCI), between the access node 120 and any user equipment (such as wireless devices 140) attached to the access node 120 on band class BAND1. In some circumstances, a plurality of relay wireless devices 130 may be attached to the donor access node 110 on band class BAND1. Additional relay wireless devices attached to the donor access node 110 correspondingly increase the potential for crosstalk and/or CCI with user devices attached to access node 120 on band class BAND2. For example, increase of CCI may be in proportion to the log of the number of relay wireless devices attached to the donor access node 110. Stated another way, CCI is proportional to log(N), where N is the number of relay wireless devices attached to the donor access node 110.

Accordingly, the access node 120 may be configured to offload user equipment from frequencies on BAND1 to frequencies on BAND2 based on one or more radio characteristics failing to meet a threshold that is set based at least in part on the number of wireless relay devices attached to the donor access node 110. For example, the one or more threshold radio characteristics may include one or both of a threshold radio signal strength characteristic and a threshold radio signal quality characteristic. Information regarding the number of relay wireless devices attached to the donor access node 110 may be transmitted to the access node 120 through a communication interface such as the X2 interface shown in FIG. 1 or another direct communication link between donor access node 110 and access node 120, and threshold radio characteristics may be set based at least in part on the number of relay wireless devices attached to the donor access node 110.

Example signal quality levels or characteristics may comprise a Received Signal Strength Indicator (RSSI), Reference Signal Received Quality (RSRQ), Reference Signal Received Power (RSRP), or any other suitable signal level. The access node 120 may be configured to encourage wireless devices 140 to request a handover from BAND1 to BAND2 based on the signal quality characteristics measured by the user device meeting or failing to meet the predetermined signal threshold.

The predetermined signal threshold may be altered based on a number of relay wireless devices attached to the donor access node 110. In a long-term evolution (LTE) system, signal level parameters including thresholds are transmitted to end-user wireless devices in system information block (SIB) messages, and measurement events such as A2, A3, and A5 events can trigger a handover request from end-user wireless devices based on whether a signal level of an access node exceeds or falls below a threshold. Under some conditions, a handover may be forced on the end-user wireless device, and the process of the user-device requesting a handover based on measurement events such as the A2, A3, and A5 events is bypassed.

Figure 3:
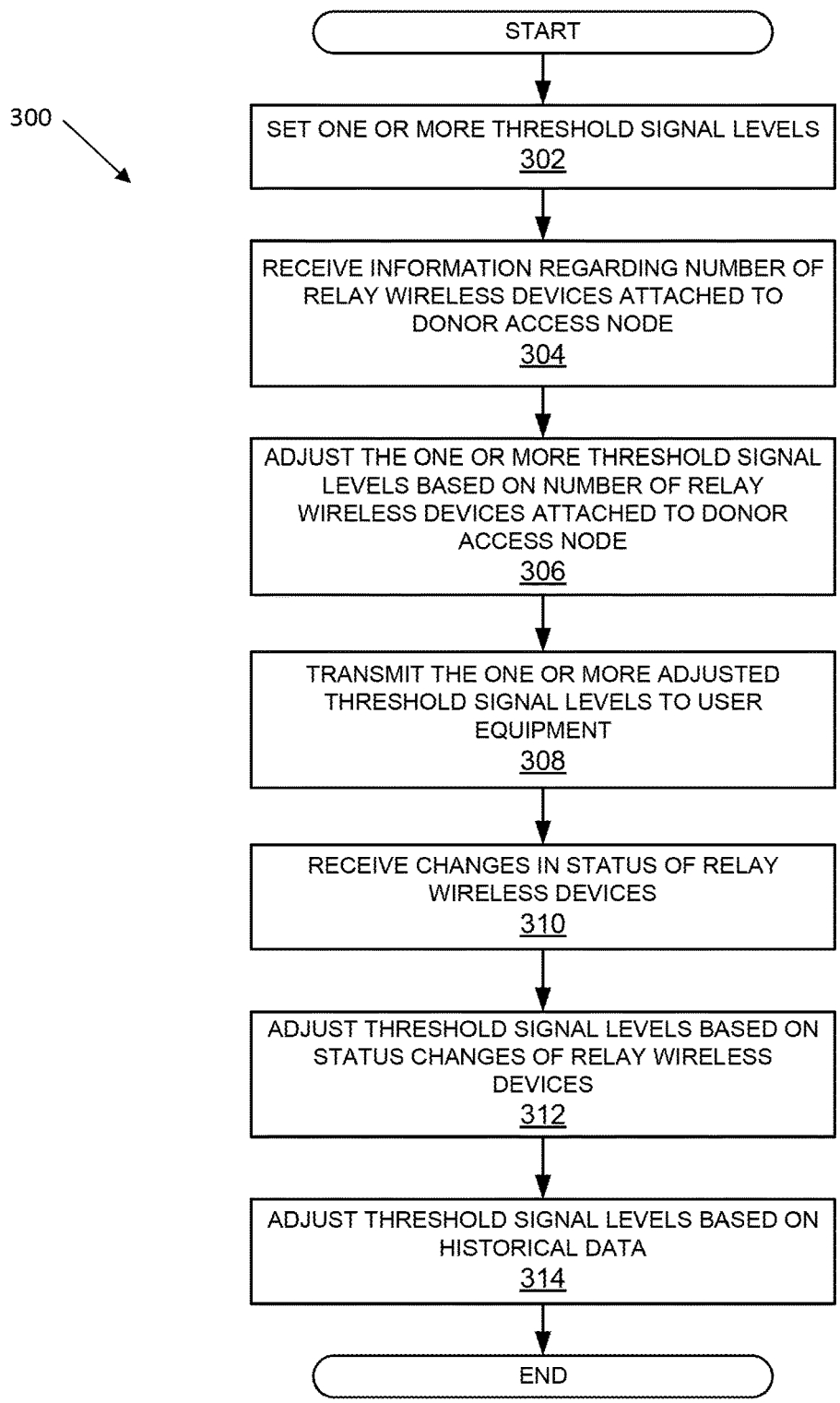
FIG. 3 depicts an exemplary method for dynamic handover threshold adjustment.

Referring now to FIG. 3, a method 300 of dynamically adjusting inter-frequency handover thresholds is shown. At 302, a default threshold signal level is set, e.g., by the access node 120. The signal level may be any one or more of the radio characteristics, signal quality levels or signal strength levels noted above, such as RSSI, RSRQ, RSRP, or some other signal level. The threshold signal level may be chosen (e.g., set or determined) based on considerations such as potential for crosstalk and/or co-channel interference between devices using the same channels within a frequency band, loading of a particular band class, distance and coverage availability in a particular geographic area, or other considerations. In the exemplary embodiment of FIG. 3, the default threshold signal level is set by the access node 120 (FIG. 1). The default threshold signal level may include, for example, a minimum threshold signal level associated with BAND1 and a maximum threshold signal level associated with BAND2.

At 304, information regarding a number of relay wireless devices (e.g., relay wireless device 130) attached to a donor access node (e.g., donor access node 110 shown in FIG. 1) is received. For example, the information may be received at the access node 120 through the X2 communication connection, through the communications links 106, 107, or through some other communication protocol.

At 306, once the access node 120 has received information from the donor access node 110 that a plurality of relay wireless devices are attached to the donor access node 110, the access node 120 can adjust the signal thresholds for handover based on the information received from the donor access node 110 and transmit the adjusted signal thresholds to the end-user wireless devices 140 that are attached to the access node 120. Based on the number of relay wireless devices that are attached to the donor access node 110, the access node 120 may transmit updated handover thresholds to end-user wireless devices 140.

For example, at 308, the access node 120 transmits adjusted handover thresholds to the end-user wireless devices attached to the access node 120. The adjusted handover thresholds may include one or both of an increase of a threshold minimum signal level associated with band class BAND1, and/or a decrease of a threshold maximum signal level associated with band class BAND2. The end-user wireless devices monitor measurements of signals and compare the measurements with the adjusted thresholds. When the end-user wireless devices 140 monitor measurements of signals in coverage areas 125, 126, the end-user wireless devices 140 are more likely to determine, due to the adjusted handover thresholds, that a signal in band class BAND1 is below the increased threshold minimum, and/or that a signal in band class BAND2 is above the decreased threshold maximum signal level. Therefore, the end-user devices are more likely to request a handover to band class BAND2. Pushing these devices to BAND2 can help to avoid interference, such as crosstalk or CCI, that may otherwise occur between the user devices attached to access node 120 and the relay wireless devices attached to the donor access node 110.

Because the potential for interference originating from the communication between the donor access node 110 and the relay wireless device 130 affecting the end-user wireless devices 140 increases with the number of relay wireless devices 130 attached to the donor access node 110, the threshold minimum signal level associated with band class BAND1 may be set by the access node 120 based on the number of relay wireless devices attached to the donor access node 110. For example, in the embodiment of FIG. 3, the threshold minimum signal level associated with BAND1 is increased proportionally with an increase in number of relay wireless devices attached to the donor access node 110. Similarly, the threshold maximum signal level associated with band class BAND2 is reduced proportionally with the increase in number of relay wireless devices attached to the donor access node 110. Adjusting the signal thresholds in this manner encourages the wireless devices 140 to request a handover to band class BAND2, where the wireless devices 140 will no longer be subject to interference on band class BAND1 due to the presence of relay wireless devices attached to band class BAND1 deployed by the donor access node 110.

As a result of the adjusted threshold signal levels, user equipment (e.g., wireless devices 140) attached to access node 120 may be offloaded from BAND1 to BAND2 as the user equipment 140 requests handovers from BAND1 to BAND2. Once the user equipment is attached to the access node 120 on BAND2 rather than BAND1, potential for interference, such as crosstalk or co-channel interference as a result of relay wireless devices attached to the donor access node 110 on BAND1 is reduced or eliminated.

At 310, if any of the relay wireless devices attached to the donor access node 110 experience a change in status, such as the relay wireless device attaches to a different donor access node, or the relay wireless device enters an idle state, that information is communicated to the access node 120, such as through the X2 connection or other connections noted above. For example, the donor access node 110 may identify a number of idle relay wireless devices of the number of relay wireless devices attached to the donor access node 110, and the access node 120 may alter the signal threshold levels accordingly at 312. Because a reduction in the number of relay wireless devices attached to the donor access node 110 on band class BAND1 reduces the potential for interference with user equipment attached to the access node 120 on band class BAND2, the signal threshold levels may be altered so that the user equipment will prefer band class BAND1 to band class BAND2. For example, based on information from the donor access node 110 indicating a reduction in number of active relay wireless devices attached to the donor access node 110 on band class BAND1, the access node 120 may reduce the threshold minimum signal level for BAND1 and increase the threshold maximum signal for BAND2, thereby encouraging the user equipment to relatively prefer BAND1 to BAND2 compared to the behavior of the user equipment based on the threshold levels set at 306.

Other information may optionally be used to adjust the threshold signal levels in addition to, or in place of, the information related to the actual number of relay wireless devices attached to the donor access node 110. For example, at 314, the access node 120 may adjust the threshold signal levels based on historical data related to the number of relay wireless devices attached to the donor access node 110. In the exemplary embodiment of FIG. 3, the access node 120 may adjust the threshold signal levels based on, e.g., time of day or week. For example, certain times of the day, week, month, or year may be historically associated with a relatively greater number of active relay wireless devices attached to nearby donor access nodes. Such information may be used alone, or in conjunction with the information related to the actual number of relay wireless devices attached to the donor access node, to adjust the threshold signal levels.

In an alternative embodiment, rather than transmitting adjusted threshold signal levels to the user equipment and allowing the user equipment to request a handover to BAND2 based on the signal levels, the access node 120 (FIG. 1) may be configured to direct user equipment to change from BAND1 to BAND2 without undergoing a handover request process. Stated another way, based on the number of relay wireless devices attached to donor access node 110, the access node 120 may direct user equipment such as wireless devices 140 to move from BAND1 to BAND2 when the number of relay wireless devices attached to the donor access node 110 indicates potential for interference to occur between the wireless devices 140 and the access node 120. Conversely, when the number of relay wireless devices attached to the donor access node 110 is lower, indicating less potential for interference, the access node 120 may direct user equipment from BAND2 to BAND1, and/or prevent user equipment from leaving BAND1 in favor of BAND2.

The exemplary systems and methods described herein can be performed by the access node 120, or by the user equipment based on information received from the access node 120, e.g., through SIB communications from the access node 120. In addition, while the systems and methods are described with relay wireless devices attached to only the donor access node 110, in some embodiments, the systems and methods encompass operations as between two donor access nodes or other combinations of donor and non-donor access nodes.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access nodes 110, 120, wireless devices 140, 142, and 144 and/or communication network 101.

Figure 4:
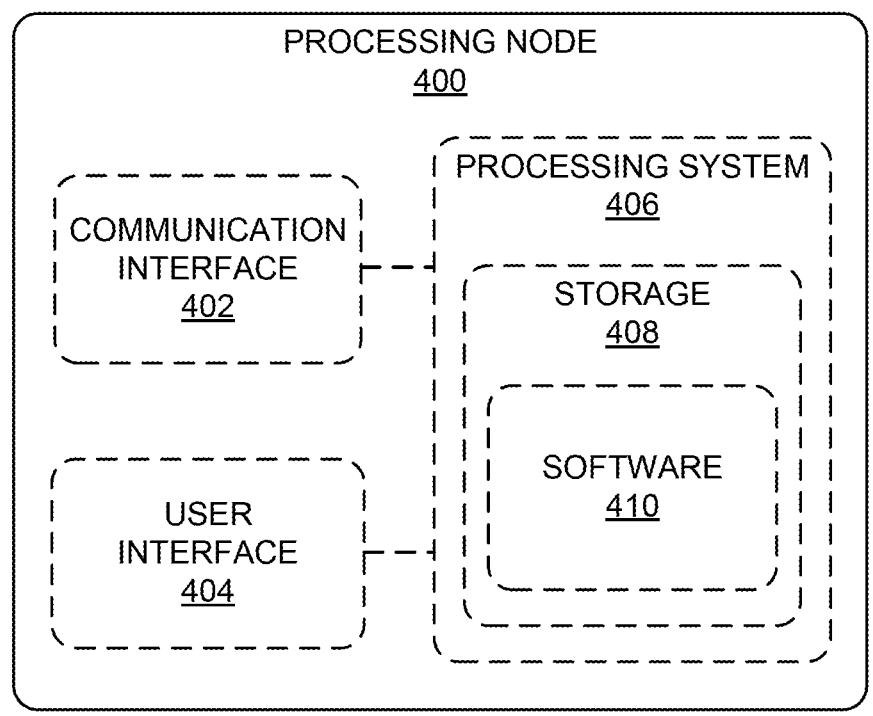
FIG. 4 depicts an exemplary processing node.

FIG. 4 depicts an exemplary processing node 400 comprising communication interface 402, user interface 404, and processing system 406 in communication with communication interface 402 and user interface 404. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. For example, storage 408 may include a buffer. Software 410 may include computer programs, firmware, or some other form of machine-readable instructions, including an operating system, utilities, drivers, network interfaces, applications, or some other type of software. For example, software 410 may include a call admission control module. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of allocating frequency bands of an access node, the method comprising:
   determining a number of relay wireless devices attached to a donor access node neighboring the access node;
   transmitting to the access node information related to the number of relay wireless devices attached to the donor access node;
   altering an inter-frequency handover threshold of the access node based at least in part on the information related to the number of relay wireless devices attached to the donor access node by increasing a minimum threshold signal level associated with a first frequency band deployed by the access node and decreasing a maximum threshold signal level associated with a second frequency band deployed by the access node; and
   offloading user equipment from the first frequency band deployed by the access node to the second frequency band deployed by the access node.

2. The method of claim 1, wherein the inter-frequency handover threshold is based on at least one radio characteristic of the access node.

3. The method of claim 2, wherein the at least one radio characteristic comprises a radio signal quality characteristic.

4. The method of claim 2, wherein the at least one radio characteristic comprises a radio signal strength characteristic.

5. The method of claim 1, further comprising determining a number of idle relay wireless devices of the number of relay wireless devices attached to the donor access node.

6. The method of claim 1, further comprising transmitting altered inter-frequency handover threshold signal levels to user equipment attached to the access node.

7. The method of claim 1, wherein the first frequency band comprises a time-division duplex band and the second frequency band comprises a frequency-division duplex band.

8. A method of allocating frequency bands of an access node among user devices, the method comprising:
   determining a number of wireless relay devices attached to a donor access node neighboring the access node;
   transmitting to the access node information related to the number of wireless relay devices attached to the donor access node;
   based at least in part on the information related to the number of wireless relay devices attached to the donor access node, altering a threshold radio characteristic of the access node by increasing a minimum threshold signal level associated with a first frequency band class of the access node and decreasing a maximum threshold signal level associated with a second frequency band class of the access node;
   comparing a radio characteristic of the access node with the threshold radio characteristic; and
   offloading a relay wireless device from a first frequency band class of the access node to a second frequency band class of the access node based on a comparison of the radio characteristic and the threshold radio characteristic.

9. The method of claim 8, wherein the threshold radio characteristic is based at least in part on historical data related the number of relay wireless device attached to the donor access node.

10. A system, comprising:
    an access node;
    a neighboring donor access node; and
    a processor associated with the access node configured to:
      receive information related to a number of relay wireless devices attached to the donor access node;
      alter a threshold radio characteristic based at least in part on the information related to the number of relay wireless devices attached to the donor access node by one or both of increasing a minimum threshold signal level associated with a first frequency band class of the access node and decreasing a maximum threshold signal level associated with a second frequency band class of the access node; and
      offload a user device from a first frequency band class of the access node to a second frequency band class of the access node based on a comparison of the radio characteristic and the threshold radio characteristic.

11. The system of claim 10, wherein the processor is further configured to receive historical data related to a number of relay wireless devices attached to the donor access node.

12. The system of claim 10, wherein the first frequency band class comprises a time-division duplex frequency band.

13. The system of claim 10, wherein the second frequency band class comprises a frequency-division duplex frequency band.

* * * * *